May 4, 1937.  W. W. ERLEWINE  2,079,113
PITMAN STIRRUP BEARING
Filed June 24, 1935  2 Sheets-Sheet 1
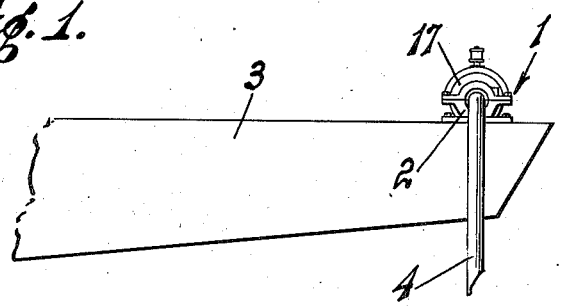
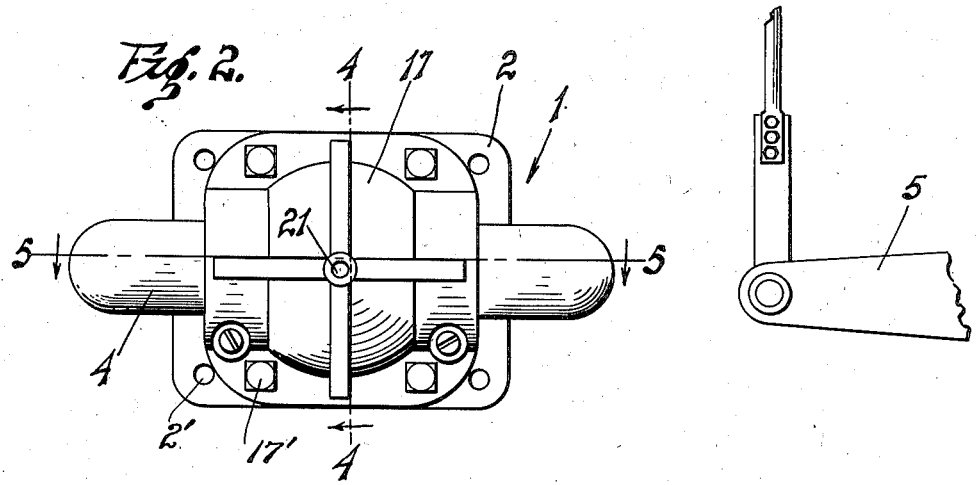
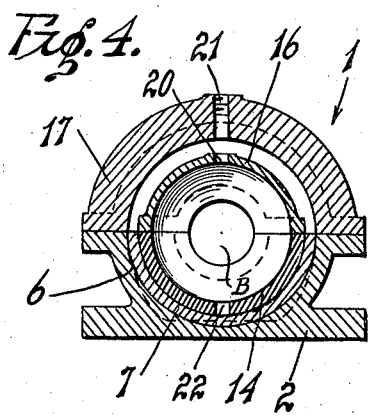
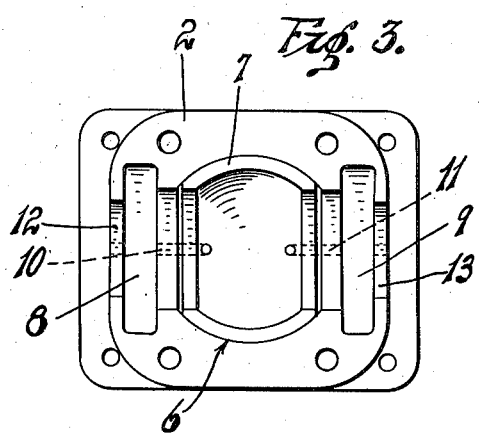
INVENTOR.
WALTER W. ERLEWINE.
BY
ATTORNEY.

May 4, 1937.                W. W. ERLEWINE                2,079,113
                          PITMAN STIRRUP BEARING
                          Filed June 24, 1935         2 Sheets-Sheet 2
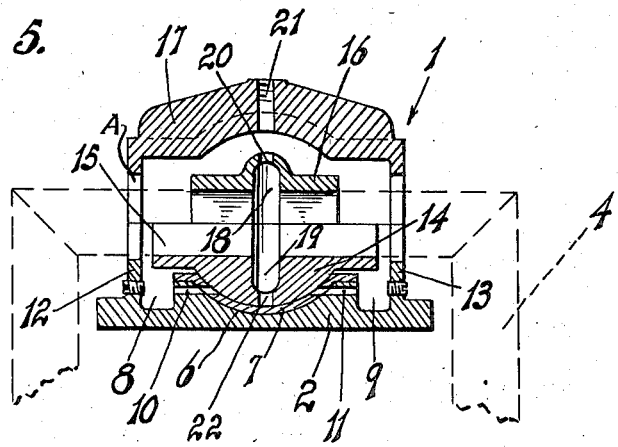
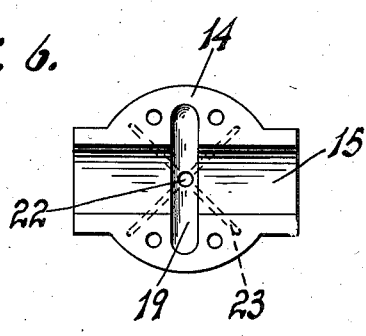
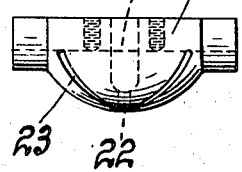
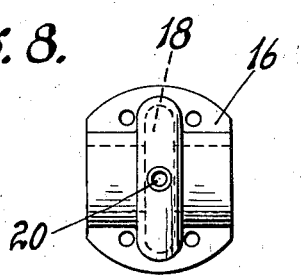
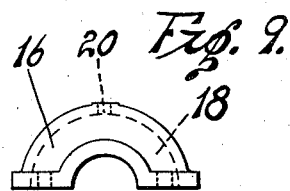
INVENTOR.
WALTER W. ERLEWINE.
BY.
ATTORNEY.

Patented May 4, 1937

2,079,113

UNITED STATES PATENT OFFICE 2,079,113

PITMAN STIRRUP BEARING

Walter W. Erlewine, Long Beach, Calif.

Application June 24, 1935, Serial No. 28,149

3 Claims. (Cl. 308—2)

This invention relates to a novel pitman stirrup bearing whereby the stirrup in a pumping well is attached to the walking beam in a novel manner so that the stirrup has a universal movement relative to the beam, thereby eliminating excessive wear and stress due to misalignment of the beam and stirrup.

An object of my invention is to provide a novel pitman stirrup bearing which can be easily and quickly attached to the walking beam and to which the pumping stirrup can be easily secured, and when the well is being pumped, no excessive wear or strain will be placed on the stirrup due to misalignment of the beam and stirrup or the warping of a wooden beam.

Still another object is to provide a stirrup bearing of the character stated, which is quickly and easily placed on the beam and which can be easily disassembled for purpose of repair.

Another feature resides in the novel oiling system and reservoirs whereby the bearing is effectively oiled, and further, which will remain properly lubricated over an extended period.

Another feature is the elimination of excessive friction and wear. Also there is a considerable saving in labor because the bearing requires little or no attention.

Other objects, advantages and features of invention may appear from the accompanying drawings, the subjoined detailed description, and the appended claims.

In the drawings

Figure 1 is a fragmentary side elevation of the walking beam and the pitman with my bearing mounted on the beam.

Figure 2 is a top plan view of the bearing.

Figure 3 is a plan view of the bearing base.

Figure 4 is a sectional view taken on line 4—4 of Fig. 2.

Figure 5 is a sectional view taken on line 5—5 of Fig. 2.

Figure 6 is a top plan view of the hemispherical bearing block.

Figure 7 is a side elevation of the same.

Figure 8 is a top plan view of the bearing cap.

Figure 9 is an end view of the same.

Referring more particularly to the drawings, my bearing 1 includes a base 2. This base is suitably bolted, clamped, or otherwise fixedly secured to the walking beam 3, by means of bolt holes 2' or the like, through which bolts are adapted to extend.

The pitman stirrup 4 is journaled in the bearing 1 and is attached to the crank arm 5 in the usual and well known manner so that the walking beam may be oscillated to pump the well. The base 2 has a hemispherical core 6 formed within it, and a liner 7 is fitted tightly in this cored recess. On each side of the cored recess 6, I provide oil sumps 8, 9. Oil ducts 10, 11 extend from the sumps 8, 9, respectively, into the inner surface of the liner 7. These ducts are drilled thru the base and thru the liner so as to feed oil into the liner, for a purpose to be further described.

The outer walls 12, 13 are somewhat higher than the top surface of the liner 7 so that oil will flow not only thru the ducts 10, 11 but also over the liner and thence onto the inner surface of said liner. Thus, I provide what might be termed an over-feed and an under-feed of the oil onto the bearing surface.

A hemispherical bearing block 14 is fixedly attached to the stirrup 4 in the following manner: The bearing block is formed with a transverse recess 15 into which the horizontal part of the stirrup fits. A cap 16 fits over the stirrup and is bolted securely to the bearing block 14 forming opening B. Thus, the block is fixedly attached to the stirrup. A cover plate 17 is bolted onto the base 2 and serves to protect the bearing block and the cap. Bolts 17' extend through the plate into the base, thus securing the cover plate to the base. The cover plate and base form an opening A in the sides thereof through which the stirrup extends. A semi-circular oil passage 18 is cored out of the cap 16 and a semi-circular oil passage 19 in the block 14 matches with the passage 18 so that oil is conducted around the stirrup 4. An oil hole 20 in the top of the cap 16 permits oil to be dropped thru an oil hole 21 in the cover 17, thence around the passages 18, 19, and finally thru an oil hole 22 in the bottom of the block 14. The oil is then distributed to the surface between the block and the liner 7 by means of the grooves 23. An oil feed can be mounted in the hole 21, if desired.

From the foregoing description, it will be evident that I have provided a universal bearing for the stirrup, which bearing is oiled from the sumps 8, 9 and also from the oil feed thru the bearing cover.

Having described my invention, I claim:

1. A pitman stirrup bearing, comprising a base, said base having a hemispherical recess cored therein, a hemispherical bearing block journaled in said recess, a cap detachably secured to the bearing block and extending over the stirrup, whereby the block is detachably secured to the stirrup, said base having oil sumps therein, ports extending from the oil sumps to the bearing block, a cover detachably secured to the base, said cap and bearing block having aligned oil passages extending around the stirrup, said cap having an oil hole in the top thereof communicating with said passages, and said bearing block having an oil hole in the bottom thereof communicating with said passages.

2. A pitman stirrup bearing, comprising a base, said base having a hemispherical recess therein, a hemispherical bearing block seated in said recess, a cap detachably secured to the bearing block, said cap extending over the stirrup, whereby the bearing block is detachably secured to the stirrup, a cover detachably secured to the base, said cap and bearing block having aligned oil passages therein extending around the stirrup, said cap having an oil hole in the top thereof, said bearing block having an oil hole in the bottom thereof, both of said holes communicating with said passages.

3. A pitman stirrup bearing, comprising a base, said base having a hemispherical recess therein, a hemispherical bearing block seated in said recess, a cap detachably secured to the bearing block, said cap extending over the stirrup, whereby the bearing block is detachably secured to the stirrup, a cover detachably secured to the base, said cap and bearing block having aligned oil passages therein extending around the stirrup, said cap having an oil hole in the top thereof, said bearing block having an oil hole in the bottom thereof, both of said holes communicating with said passages, said base having oil sumps therein, and oil ports extending from the sumps to the bearing block.

WALTER W. ERLEWINE.